United States Patent [19]

Yarnell

[11] Patent Number: 4,624,352

[45] Date of Patent: Nov. 25, 1986

[54] SYNCHRONIZER SPRING PIN

[75] Inventor: James A. Yarnell, Temperance, Mich.

[73] Assignee: Dana Corporation, Toledo, Ohio

[21] Appl. No.: 759,810

[22] Filed: Jul. 29, 1985

[51] Int. Cl.⁴ ............................................. F16D 23/06
[52] U.S. Cl. .................................. 192/53 E; 74/339; 192/53 F
[58] Field of Search ............... 192/53 E, 53 F; 74/339

[56] References Cited

U.S. PATENT DOCUMENTS

| Re. 22,265 | 2/1943 | White | 192/53 F |
| 2,179,568 | 11/1939 | White | 192/53 F |
| 2,221,893 | 11/1940 | White | 192/53 F |
| 3,631,952 | 1/1972 | Sugimoto et al. | 192/53 F |
| 4,252,222 | 2/1981 | Morscheck | 192/53 F |
| 4,252,223 | 2/1981 | Morscheck | 192/53 F |
| 4,462,489 | 7/1984 | Morscheck | 192/53 E |
| 4,584,892 | 4/1986 | Hiraiwa et al. | 192/53 F X |

FOREIGN PATENT DOCUMENTS

| 1094051 | 12/1960 | Fed. Rep. of Germany . |
| 1555158 | 1/1971 | Fed. Rep. of Germany . |
| 1181512 | 1/1959 | France . |

Primary Examiner—Allan D. Herrmann
Attorney, Agent, or Firm—Frank B. McDonald

[57] ABSTRACT

A synchronizer spring pin provides an elongated single-piece S-shaped body disposed for installation in axially aligned apertures of a pair of opposed blocker rings. In a preferred form, the spring pin is positioned within a double-acting synchronizer clutch and defines a body of spring steel, the body having a reversely symmetrical orientation with respect to the blocker rings. Each end of the spring pin body defines a bight portion and a leg portion spaced from the bight portion in the normally unstressed position of the spring pin.

6 Claims, 4 Drawing Figures

SYNCHRONIZER SPRING PIN

BACKGROUND OF THE INVENTION

This invention relates to transmission synchronizer clutch systems of the type including axially opposed blocker rings. The rings have opposed friction surfaces positioned for engaging like surfaces on jaw clutch members of selective gears rotatable about a common shaft within the transmission housing. More particularly, the invention relates to spring pins disposed for facilitating engagement of such friction surfaces in response to the selective actuation of a manually operated shifting mechanism.

Synchronizer clutches of the coacting type are well known in the art of medium duty transmissions. Such clutches are effective to synchronize jaw clutch members prior to contact with and engagement of gear teeth in order to provide shifting without clashing of gears. The spring pins typically facilitate engagement of the blocker rings by initially and resiliently moving the friction surfaces into engagement under a relatively low force in response to the incipient engaging movement of the transmission shifting mechanism. However, most of the spring pins systems commonly and currently utilized consist of a plurality of parts, many including separate pin and spring members. The prior art spring pins are made typically of stampings and require subsequent assembly of component parts. Even with respect to the simpler prior art structures, the fatigue lives of such spring pin parts have been relatively low.

SUMMARY OF THE INVENTION

The spring pin of the present invention presents a novel, unitary body formed of spring steel, and is considerably simpler to manufacture than most prior art spring pin systems. In addition, the use of spring steel per se provides a significantly improved fatigue life, providing up to four hundred thousand cycles. In a preferred form, the spring pin is disposed for operation in a double-acting synchronizer clutch system which includes two axially opposed blocker rings having axially aligned bores for receiving and seating respective ends of the spring pin. The spring pin defines an elongated S-shaped body, each end of which defines a bight portion and a spring leg portion spaced from the bight portion in its normally unstressed position. Also in the preferred form, oppositely extending outside leg portions of the spring pin each contain a pair of symmetrically opposed detents positioned intermediate the ends of the spring pin body for engagement of a shifter flange. The flange is directly coupled to a shifter mechanism and is hence manually operated to effect synchronization and subsequent gear engagement.

DETAILED DESCRIPTION OF A PREFERRED EMBODIMENT

Figure 1:
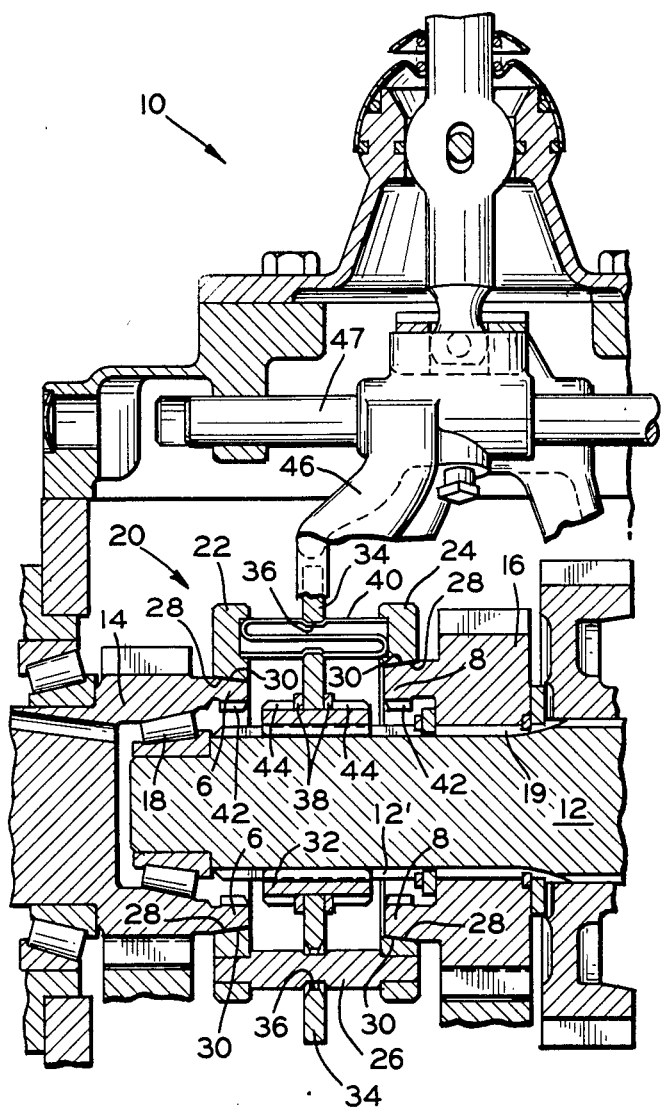
FIG. 1 is a fragmentary cross-sectional view of a transmission which includes a double-acting clutch synchronizer incorporating a preferred embodiment of the present invention.
Figure 2:
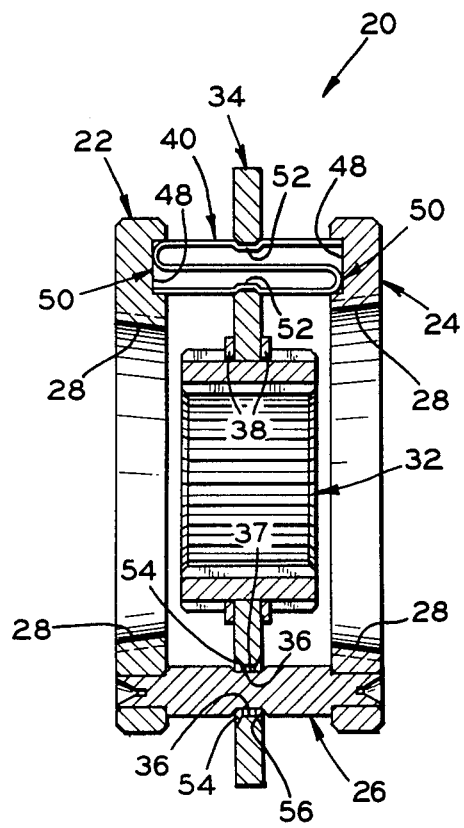
FIG. 2 is an enlarged cross-sectional separate view of the double-acting synchronizer clutch system depicted in FIG. 1.

Referring initially to FIG. 1, a transmission 10, only fragmentarily shown, incorporates a preferred embodiment of a double-acting synchronizer clutch system 20, as separately shown in FIG. 2. The transmission 10 includes a rotatable mainshaft 12 containing coaxial gears 14 and 16 positioned thereon. Each of the gears 14 and 16 is rotatably mounted on individual bearing systems 18 and 19, respectively, on the rotatable shaft 12. The bearing system 18 supporting the gear 14 is of the tapered roller type, while the bearing system 19 supporting the gear 16 is of the fluted type.

Referring now to both FIGS. 1 and 2, the double-acting synchronizer clutch system 20 incorporates left and right blocker rings 22 and 24, respectively; each preferably made of bronze material for optimal wear. The rings 22 and 24 are rigidly secured together by three circumferentially spaced blocker pins 26 (only one of which is shown), which extend axially between the rings. Circumferentially and uniformly spaced intermediately of each pair of blocker pins is a spring pin 40 (only one of which is shown), as will hereinafter be described. Each blocker ring contains an internal frustoconical friction surface 28, and each gear 14 and 16 includes a jaw clutch member 6 and 8, respectively, coaxially positioned with respect to the gears. Each jaw clutch member contains a mating external frustoconical friction surface 30 disposed for engagement with one of the friction surfaces 28 of the two blocker rings.

Symmetrically interposed between the blocker rings 22 and 24 is a clutch collar 32 internally splined to the mainshaft 12 as shown at 12'. A shifter flange 34 is rigidly coupled to the clutch collar 32 by means of snap rings 38 which axially retain the flange 34 on the collar 32. In the presently preferred embodiment, six apertures are uniformly and circumferentially spaced apart within the flange 34 for accommodating the aforenoted three blocker pins 26 and three spring pins 40.

Each jaw clutch member 6 and 8 contains one set of internal jaw clutch teeth 42 selectively mateable with external jaw clutch teeth 44 on the clutch collar 32. The clutch collar is moved from the neutral position shown by means of a manually operated shift fork 46 which is axially movable along a shift rail 47 by an operator of an associated vehicle.

Referring momentarily only to FIG. 2, each spring pin 40 is positioned within a pair of aligned bores or recesses 48, each disposed for receiving one end 50 of a spring pin 40. Moreover, each spring pin 40 includes an opposed pair of detents 52 positioned intermediately on each elongated spring pin body for resiliently securing the shifter flange 34 against axial movement between shifts. Also in FIG. 2, it will be noted that each aperture 36 of the shifter flange 34 contains a chamfer which provides a cam contact surface 54 for a mating chamfer surface 56 on each blocker pin 26, each mating chamfer surface positioned within a detent 37 on each pin as shown.

The operation of the double-acting synchronizer clutch system 20 can now be described as follows, making reference to both FIGS. 1 and 2. Upon movement of the manually operated shift fork 46 either rightwardly or leftwardly, the cam contact surface 54 positioned on the three apertures 36 in contact with one of the spring pins 40 will bear against either the leftward or rightward edge of the opposed detents 52 of each of the spring pins 40. To the extent that leftward and rightward movements effect reversely identical results, for convenience the operation of the synchronizer clutch system 20 will be described only with reference to leftward movement of the shift fork 46.

As those skilled in the art will appreciate, the ultimately achieved full leftward movement of the shift fork 46 will effect a lock-up engagement of the gear 14 and the shaft 12, which prior thereto will generally be rotating at different speeds. Thus, the shifting operation herein is described assuming such actual difference in relative speeds prior to completion of the shift. Initial leftward movement of the shift fork 46 causes the shifter flange 34 to begin to move leftwardly. The three cam contact surfaces 54 associated with the three spring pins 40 will bear against the left edges of the detents 52 of the associated spring pins 40. The leftward ends 50 of the spring pins 40 seated in the recesses 48 of the left blocker ring 22 will be effective to shift the entire synchronizer blocker ring system 20 leftwardly, and the friction surface 28 of the ring 22 will then contact the mating friction surface 30 of the jaw clutch member 6.

At this point, the cam contact surfaces 54 associated with the three blocker pins 26 will contact the mating contact surfaces 56 of the blocker pins, and the cam contact surfaces 54 associated with the spring pins 40 will ride up out of the detents 52. Further leftward movement of the shift fork 46 will cause additional pressure between friction surfaces 28 and 30 by virtue of the shifter flange contact surfaces 54 against the blocker pin cam contact surfaces 56, whereby the relative speed between the gear 14 and the shaft 12 will begin to approach zero. Upon the reaching of identical speeds between the gear 14 and the shaft 12, the cam contact surfaces 54 of the shifter flange bearing against those surfaces 56 of the blocker pins will ride up out of the blocker pin detents 37. Further leftward movement of the shifter fork 46 will cause the jaw clutch teeth 44 of the clutch collar 32 to engage the jaw clutch teeth 42 of the jaw clutch member 6 on the gear 14 for effective lock-up between the gear 14 and the shaft 12.

Figure 3:
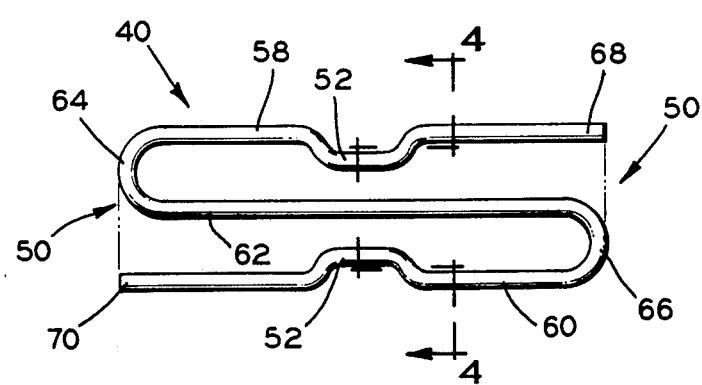
FIG. 3 is an enlarged detail view of the preferred embodiment of the spring pin incorporated in the clutch synchronizer FIGS. 1 and 2.

It will be appreciated, particularly by those skilled in this art, that the resilience of the spring pin 40 is critical for controlling the incipient frictional movement of the flange apertures 36 with respect to the spring pin detents 52. The present inventor has determined that the resilience requirement is most satisfactorily controlled by means of the S-body spring system 40 of the present invention and as shown more particularly in FIG. 3. It should be noted that the spring pin 40 not only provides a centering function for the shifter flange 34 between shifts, but that it is also effective to dampen vibration and thereby cut noise during the operational life of the transmission. Moreover, centering of the shifter flange 34 between shifts avoids unnecessary wear of the cam contact surfaces 56, blocker friction surfaces 28, and jaw clutch friction surfaces 30, as will also be appreciated by those skilled in this art.

In its preferred form, the spring pins 40 are formed of a spring steel having a relatively high carbon content, as for example with an SAE range of 1070 to 1090, for the strength and high fatigue life required in this environment A preferred range of Rockwell hardness is 50 to 55. The use of spring steel in combination with the S-body shape of the spring pin 40 provides a "radial springiness" aspect sufficient to provide a more satisfactory resilience as well as an improved longevity for the spring pin. Moreover, the use of a single-piece spring pin system provides a manufacturing cost-savings not typically available in prior art spring pin systems.

Referring again particularly to FIG. 3, each spring pin is formed with a pair of opposed detents 52 as earlier noted, each positioned intermediately of the ends 50 of the elongated body of the spring pin 40. Each spring pin defines a first leg 58 and a reversely extending second leg 60, each leg containing one of the pair of detents. An intermediate third leg 62 integrally joins the first and second legs 58 and 60 together. Each end 50 defines a bight portion 64 and 66, respectively. The bight 64 is formed by the integral joinder of the first and intermediate legs, while the bight 66 is formed by the integral joinder of the second and intermediate legs. Each end 50 thus defines a bight and a leg end 68,70; the left end 50 defining the afore-described bight 64 and the end 70 of the second leg 60, while the right end 50 defines the bight 66 and the end 68 of the first leg 58.

In operation, those skilled in the art will appreciate that whenever the cam contact surfaces 54 associated with the spring pins 40 ride up out of the detents 52 of the spring pins, the respective bights 64, 66 and leg end portions 68, 70 of the pins will elastically move toward each other. Upon movement of the surfaces 54 back into the detents 52, the bights and leg ends will spring apart and back to the normally unstressed position represented in the drawing figures.

Figure 4:
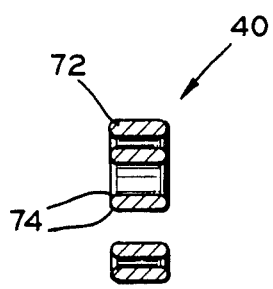
FIG. 4 is a cross-sectional view of the spring pin of FIG. 3 as viewed along lines 4—4 thereof.

Finally, referring to FIG. 4, it will be noted that the cross section 72 of the spring pin 40 in the preferred embodiment will have rounded corners defined by arcuate edges 74 as shown. The present inventor has determined that such edges were effective to avoid stress fracture propogations which otherwise occurred and shortened the fatigue life of the spring pin. In a preferred form, the cross section approaches that of an oval shape, as generally shown.

Although only one preferred embodiment has been detailed and shown herein, the following claims are envisioned to cover numerous other embodiments which fall within the spirit and scope thereof.

What is claimed is:

1. In a double-acting synchronizer clutch including a spring means having a pair of radially aligned, opposed detents, two axially movable blocker rings having opposed apertures for receiving opposed ends of said spring means, an axially movable, radially extending flange having a plurality of circumferentially spaced openings, each disposed for receiving said opposed detents when said flange is positioned in a neutral mode between said blocker rings, said blocker rings being rigidly coupled together about a common rotational axis, said rings positioned in an axially spaced relationship on opposed sides of said flange; an improvement characterized by said spring means comprising a first leg extending axially and containing one of said detents, a second leg extending reversely with respect to said first leg, parallel to and spaced therefrom, said second leg containing the other of said detents, said spring means further comprising a third leg intermediately positioned between said first and second parallel legs, said third leg integrally connecting said first and second legs, said spring means formed of spring steel, and defining an elongated S-shaped body in its normally unstressed state.

2. The spring means of claim 1 wherein said first and third legs are integrally joined together and define a bight portion at the integral joinder thereof, and wherein said second and third legs are integrally joined together and define a bight portion at an opposing end of said body at the integral joinder of said second and third legs; whereby each end of said body defines a bight portion and a spring leg portion spaced from said bight portion in the normally unstressed state of said body.

3. The spring means of claim 2 wherein axial movement of said radially extending flange effects the collapse together of said leg and bight portions of said spring means at an opposed end of said body positioned in the direction of movement of said flange.

4. The spring means of claim 3 wherein said opposed detents are symmetrically positioned intermediately of said ends of said body.

5. The spring means of claim 4 wherein said body comprises a cross section having arcuate edges.

6. The spring means of claim 5 wherein said body defines a generally oval cross section.

* * * * *